Dec. 28, 1948. W. H. KOPITKE 2,457,687
APPARATUS FOR FORMING HOLLOW ARTICLES
OF ORGANIC PLASTIC MATERIAL
Filed Jan. 13, 1945 2 Sheets-Sheet 1
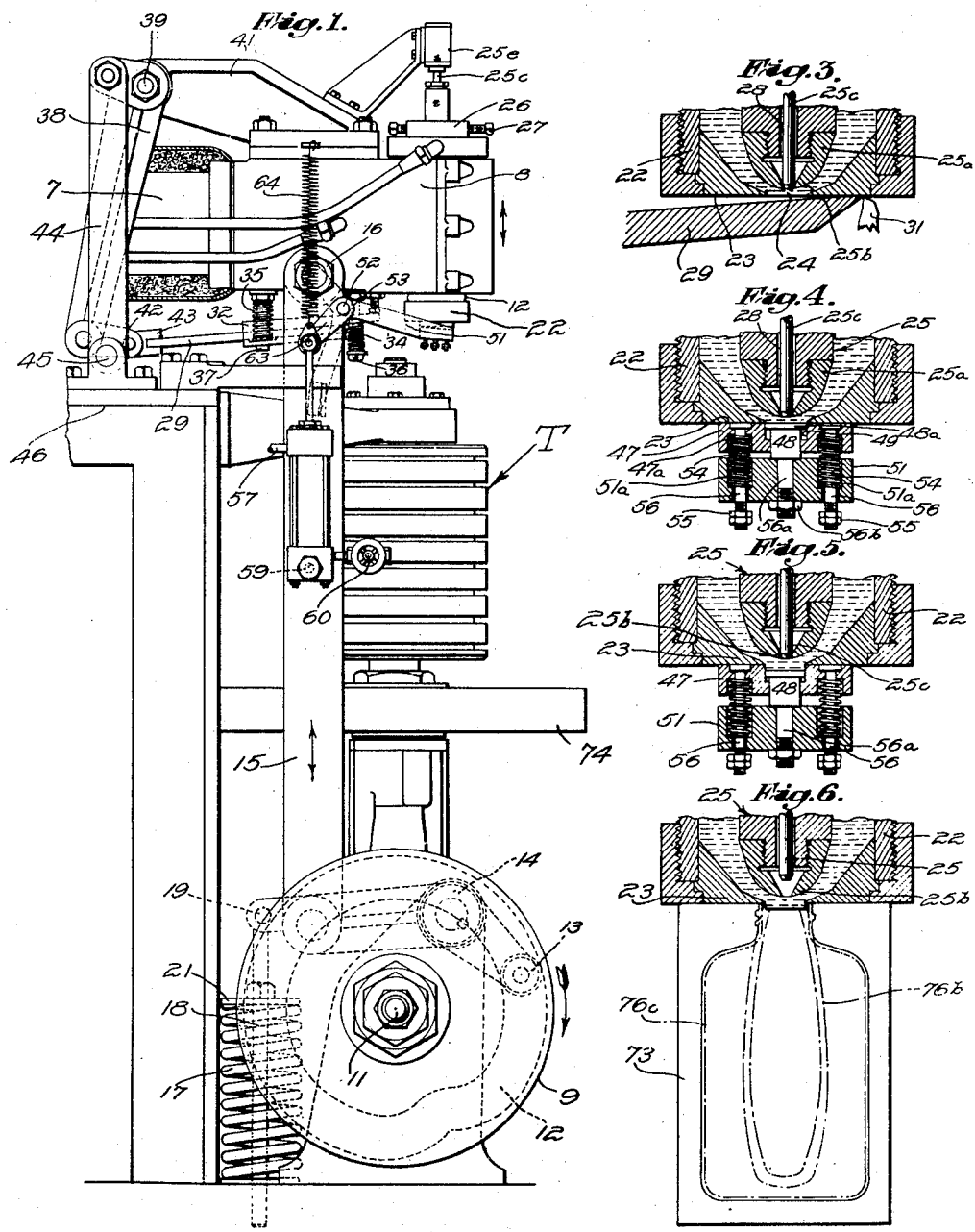
Inventor
William H. Kopitke
by John R. Hobson
Attorney Dec. 28, 1948. W. H. KOPITKE 2,457,687
APPARATUS FOR FORMING HOLLOW ARTICLES
OF ORGANIC PLASTIC MATERIAL
Filed Jan. 13, 1945 2 Sheets-Sheet 2
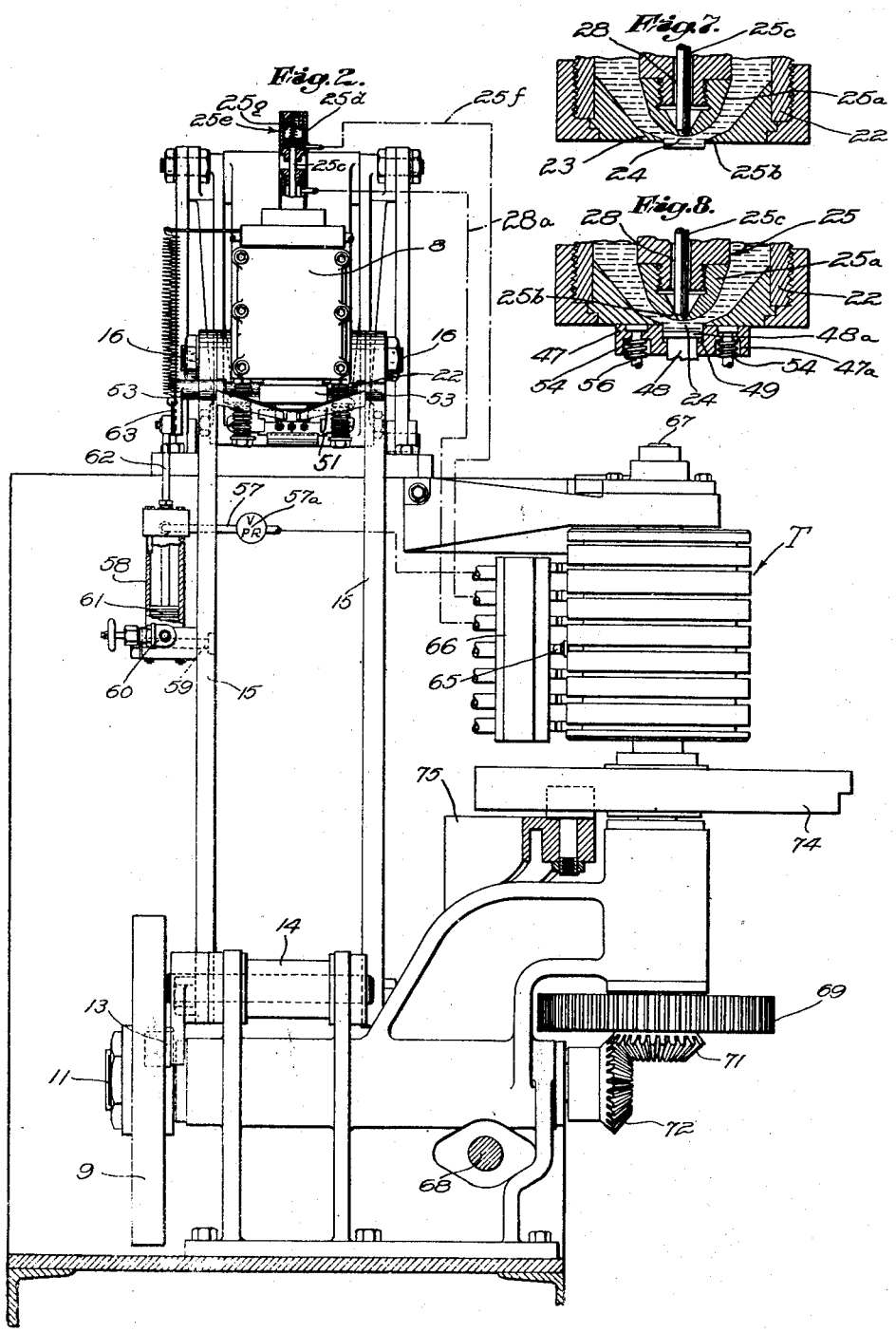
Inventor
William H. Kopitke
by John R. Hoborn
Attorney Patented Dec. 28, 1948

2,457,687

UNITED STATES PATENT OFFICE 2,457,687

APPARATUS FOR FORMING HOLLOW ARTICLES OF ORGANIC PLASTIC MATERIAL

William H. Kopitke, West Hartford, Conn., assignor to Plax Corporation, Hartford, Conn., a corporation of Delaware Application January 13, 1945, Serial No. 572,618

4 Claims. (Cl. 18—5)

This invention relates to apparatus for forming hollow articles of organic plastic materials and has particular relation to apparatus for forming hollow articles by heating such material to working temperature, forming it into tubular shape, closing the leading end of the tubular material and extruding it in the form of a bubble which is blown to final shape in a suitable mold.

In the production of hollow articles in the above manner difficulty is experienced in closing the leading end of the tubular material because the material does not flow together and weld very easily. Also, it is difficult to close the tubular material so as to avoid lumps and welds which impair the appearance of the articles. If lumps, welds or other irregularities are formed in the bottom of the bubble, they cannot be smoothed out very much because they become chilled before or during the blowing operation and therefore may remain in the bottom of the finished article.

The object of the present invention is to provide novel apparatus whereby the leading end of the tubular material to be extruded is completely closed and sealed before extrusion, or substantial extrusion, and the bottom of the bubble is formed with a minimum of irregularity so as to improve the appearance of the bottom of the final article.

More specifically an object of the invention is to provide such apparatus including a bottom forming device comprising a plate having a cavity therein, a plunger operable in the cavity, the plate and plunger being loosely and yieldingly interconnected so that the plate may be engaged with the bottom of the extrusion nozzle and the plunger caused to assume various positions in the cavity to meet differing requirements for the end closing operation.

Other objects and advantages of the invention will be pointed out in the detailed description thereof which follows or will become apparent therefrom or from the accompanying drawings to which the description refers and in which drawings:

Figure 1 is a view in side elevation of a portion of an extruding and blowing machine embodying the apparatus of the invention;

Fig. 2 is a view in front elevation of the portion of the machine shown in Fig. 1; and Figs. 3, 4, 5, 6, 7 and 8 are enlarged views in vertical section of the extrusion nozzle and associated parts, including the novel bottom-forming device, and illustrating operation of the apparatus.

The novel apparatus may be incorporated in any suitable form of extruding and blowing machine, such for example as that disclosed in my Patent No. 2,349,176 granted May 16, 1944. The drawings illustrate portions of the machine shown in that patent sufficient to enable those skilled in the art to comprehend and carry out the present invention. Such portions comprise an extrusion cylinder indicated at 7 containing a reciprocating ram (not shown) and to which cylinder is connected an extrusion head 8, this construction constituting a unitary extruder mounted on pivots (not shown) at its rear end so that the forward end thereof, including head 8, may be moved down and up into and out of cooperative position with a blow mold. Such up and down movement is effected and controlled by means of a cam 9 on a horizontal shaft 11 having a cam track 12 engaged by a roller 13 on crank 14. Connected to the crank 14 are vertical bars 15, the upper ends of which are pivoted at 16 to the extrusion head 8. The cam roller 13 is maintained in engagement with a cam track 12. Spring 17 upon a rod 18 connected at 19 to the inner end of the crank 14 and bearing against a collar 21 on the rod maintains a counterbalanced neutral position of the forward end of extrusion cylinder, reducing the load on the cam track 12 and roller 13 to a minimum.

The extrusion head is provided with a nozzle 22 having an orifice ring 23 in which is formed the orifice 24. Organic plastic material is extruded to the desired outside diameter through the orifice 24 by the pressure of the ram (not shown) in the cylinder 7. In order to form the material to tubular shape of the desired wall thickness and internal diameter, a mandrel 25 is located in the extrusion head with its tip 25a slightly above and in registry with the orifice 24, this mandrel being held in position by a collar 26 and screws 27. The mandrel 25 is provided with an air passage 28 for the purpose of admitting air to the tubular material as hereinafter explained. Passage 28 receives air through pipe 28a connected to a timer T.

In order to prevent plastic material from clogging passage 28 and to control the passage of air therethrough, a valve 25b is mounted therein. The stem 25c of the valve is connected to a piston 25d in cylinder 25e. Air is admitted to and exhausted from cylinder 25e through pipe 25f, Fig. 2, connected to timer T, to open the valve and to permit it to be closed by a spring 25g.

After an article has been formed, it is necessary to sever it from the material in the nozzle 22. This may be accomplished by a knife 29 which is moved across the bottom of the orifice ring 23 to smoothly cut away any material below the level of the bottom of the orifice ring and to clean off the bottom of the orifice ring. The material which may thus be removed is indicated at 31.

The knife 29 may be supported in an operative position in a slide 32 yieldingly held in position from beneath by springs 34 and from above by springs 35 on bolts 36 and 37 respectively screwed into the bottom of head 8. It will be seen by reference to Fig. 1 that the slide holds the knife 29 in inclined position and that therefore its cutting edge will move across the bottom of the orifice ring 23 when the knife is actuated.

The knife may be actuated in response to the up and down movement of the extruder unit effected and controlled by the cam 9. Connections for this purpose may comprise a crank 38 pivoted at 39 on bracket 41 bolted to head 8. The bottom end of the crank 38 is connected by links 42 and 43 to the inner end of the knife while the upper end of the crank 38 is connected to the upper end of a link 44, the bottom end of which has a pivot connection at 45 to the frame 46 of the machine. Thus, when the head 8 is moved upwardly by cam 9, the knife will be actuated to the right to perform its cutting and cleaning off functions, as illustrated in Fig. 3, and when the head is lowered the knife will be retracted into the position shown in Fig. 1.

The bottom-forming device may comprise a plate 47 and a plunger 48 associated therewith, the plunger operating in a cavity 49 of the plate. Relative movement between the plate and the plunger is provided for and will presently be explained, downward movement of the plunger 48 relative to the plate 47 being limited by a flange 48a on the top of the plunger.

The plate 47 and plunger 48 are mounted in an arm 51 fast on shaft 52 pivoted at its end in bosses 53 on the upper ends of the bars 15. The plate 47 rests on compression springs 54 received in holes 47a and 51a of plate 47 and arm 51 respectively. Thus the springs 54 tend to separate plate 47 from arm 51, the extent of this separation being limited and adjustable by nuts 55 on the bottom ends of rods 56 mounted in plate 47 and extending downwardly through springs 54 and loosely through arm 51. Plunger 48 has a shank 56a which is fixed in the arm 51, the plunger being rigidly held in the arm by a nut 56b.

The bottom forming device is moved into and out of engagement with the orifice ring 23 by the admission of air through a pipe 57 leading into a cylinder 58 pivoted at 59 on one of the rods 15. The pressure in pipe 57 is regulated by a valve 57a, Fig. 2. The cylinder 58 contains a piston 61, a rod 62 of which is connected at its upper end to a crank arm 63 fast on the shaft 52. When air is admitted to the upper end of the cylinder 58, piston 61 moves downwardly which raises arm 51 to engage the bottom forming device with the extrusion head. When air is exhausted from the cylinder 58 through pipe 57 a tension spring 64, connected at its bottom end to crank arm 63 and at its upper head to the extrusion head 8, raises the piston and lowers arm 51 to move it and the bottom forming device to inoperative position, as shown by the dotted lines in Fig. 1, and in which position the arm and bottom forming device are out of the way of other parts of the machine, including the knife 29. The speed of movement of piston 61 is regulated by an exhaust-intake valve 60 connected to the bottom of cylinder 58.

The admission and exhaust of air to and from the cylinder 58 is controlled by a timer T, Fig. 2, on which are mounted adjustable buttons, such as shown at 65, which operate valves, not shown, in the valve chest 66 and to which are connected air lines including the pipe 57 for the actuation of various parts of the machine, most of which are not shown. The timer T is mounted on a vertical shaft 67 driven from a main drive shaft 68 through connections partially omitted and including gear 69 on the bottom of shaft 67. A bevel pinion gear 71 on the bottom of shaft 67 meshes with a similar pinion gear 72 on shaft 11 to rotate cam 9 which effects the up-and-down movement of the extruding unit.

It will be understood that suitable molds on a suitable mold support, such as shown in my Patent No. 2,349,176, granted May 16, 1944, may be provided and operated in timed relation to the extrusion of the material through the head 8 to form hollow articles in the molds. Such a mold is indicated at 73, Fig. 6, and a cam 74 may be provided on the shaft 67 to actuate a lever 75 of mold operating mechanism, not fully shown.

The operation of the apparatus described will now be explained beginning with the operation of the knife as shown in Fig. 3. Assuming that an article will already have been formed, the knife 29 will be moved across the bottom of the orifice 23 to sever any plastic depending from the orifice and to clean off the bottom of the orifice, such plastic material being removed as indicated at 31. The knife 29 is now retracted, and the bottom forming device moved into engagement with the orifice ring 23 by actuation of piston 61 in cylinder 58. The arm 51 will be raised and plate 47 will yieldingly engage the bottom of the orifice ring under pressure of the springs 54 which at this time are more or less compressed. The compression of the springs 54 tends to move the plate 47 down on the plunger 48 so that the top of the plunger 56, which registers with the orifice in ring 23, will assume a corresponding position in the cavity 49. The yielding engagement of the plate 47 with the nozzle prevents the escape of plastic material between the ring and plate or between the ring and the top of the plunger 48.

The position of the plunger 48 in cavity 49 of plate 47 at the time that the plate engages the ring 23 varies according to whether or not any of the plastic material has exuded through the orifice which sometimes occurs on the return or idle stroke of the ram (not shown) because of expansion taking place in the material above the orifice. If no such discharge has occurred, that is, if there is no material below the plane of the bottom of ring 23, then the plunger 48 initially will assume its uppermost position in the cavity of plate 47 in engagement with ring 23 and in registry with the orifice thereof. Under these conditions, the parts of the apparatus will be in the positions shown in Fig. 4 as or after which pressure is exerted on the plastic material in the extruding unit, for example by the initial movement of the extrusion ram (not shown), to positively force the plastic material beneath the mandrel 25 and across the orifice and against the top of plunger 48 to seal any opening which may have been left from preceding operations as shown in Fig. 4. Plunger 48 is forced downward and the leading or bottom end of the tube is made smooth and continuous, as indicated in Fig. 5, and the plastic material may be caused to fill part of the cavity 49.

On the other hand, if the plastic material has exuded somewhat from the orifice in ring 23 as shown in Fig. 7, then the plate 47 moves into engagement with the ring 23, the plate and plunger 48 will engage this exuded material, seal it if open and flatten and smooth it and the plunger will be forced downwardly in the cavity 49, as shown in Fig. 8, by the resistance of the material a distance depending upon the amount of this material, and the pressure of the device will cause the plastic material to be forced into plate 47 a corresponding distance.

If the amount of material, which has exuded as the result of elasticity or expansive force of the material in the apparatus, is sufficient to fill the cavity in the plate 47 then the bottom may be formed on the tubular material solely by the upward movement of the end forming device, but otherwise it is preferred to hold the bottom plate in engagement with the nozzle long enough for the beginning of the extrusion stroke of the ram (not shown) to force the plastic material into the cavity against the plunger until the plunger has been depressed in the cavity to the necessary depth to form a seal, or bottom, of proper thickness.

The cavity 49 may be made sufficiently large to accommodate the maximum amount of plastic material that may exude between extrusion operations.

It will be understood the timing of the movements of the bottom forming device may be varied relative to the time extrusion begins under ram pressure by suitable adjustment of timer T and/or valve 60. The pressure of the device on the plastic material is so regulated by the adjustment of valve 51a as to exert sufficient force to form the bottom on the tubular material but insufficient to cause sticking of the plastic material to mandrel 25.

The bottom forming device is moved out of engagement with orifice ring 23 by the exhaust of air from cylinder 58 which allows spring 64 to pull arm 51 downwardly in the manner explained above and the ram extruding operation forms a bubble 76b, Fig. 6. As the material is extruded, a puff of air may be admitted through passage 28 by opening valve 25b, to expand the bubble if desired. As the bubble attains the desired size and shape, a mold 73 is moved into position and closed around it and the bubble blown to final shape by air pressure admitted through passage 28 past valve 25b to form a hollow article or container, as indicated at 76c. The extruding unit is now raised, and the mold with the article then moved away, knife 29 being operated to clear the orifice of surplus plastic material as explained above and the operations above described are repeated.

It will be understood that various changes may be made in the embodiment of the invention described and illustrated without departing from the scope of the claims.

Having thus described my invention, what I desire to claim and secure by Letters Patent is:

1. Apparatus for forming hollow articles of organic plastic material by extruding and expanding said material, said apparatus comprising an extrusion head, a nozzle on said head, an extrusion orifice in said nozzle, a mandrel having an air passageway therein mounted in said head in cooperative relation to said orifice for imparting tubular shape to said material, and a device for forming a bottom on said material at the nozzle comprising a plate having a cavity therein, a plunger in said cavity, means loosely connecting said plate and said plunger for relative movement, and means for moving said device into and out of engagement with said nozzle.

2. Apparatus for forming, extruding and expanding organic plastic material to form hollow articles comprising an extrusion head having a mandrel and orifice for the extrusion of the material in tubular shape, means for forming a bottom on the tubular material including a plate having a cavity therein, a plunger in said cavity, a supporting and actuating arm for said plate and plunger, means interposed between said plate and said arm to provide for relative movement between the plunger and the cavity of said plate, and means for actuating said arm to move the plate and plunger into and out of engagement with said extrusion nozzle.

3. Apparatus for extruding and expanding tubular organic plastic material to form hollow articles comprising an extrusion head having a nozzle thereon, a knife for serving plastic material from said nozzle, means for actuating said knife, a bottom forming device, means for moving said bottom forming device into and out of engagement with the bottom of said nozzle in timed relation to the operation of said knife, said bottom forming device comprising a plate having a cavity therein, a plunger operable in said cavity, and resilient connecting means between said plate and said plunger.

4. Apparatus for forming hollow articles of organic plastic material by extruding and expanding tubular material comprising an extrusion head having a nozzle thereon, tube forming means associated with said nozzle comprising a mandrel and orifice ring mounted in cooperative relation, and means for closing the leading end of a tube of material formed in said nozzle comprising a plate having a cavity therein, a plunger in said cavity, an arm for supporting and actuating said plate and said plunger, resilient means supporting said plate on said arm, means rigidly mounting said plunger on said arm, a pivotal support for said arm, and means for effecting oscillatory motion of said arm to move said plate and plunger into and out of engagement with said orifice ring.

WILLIAM H. KOPITKE.

REFERENCES CITED

The following references are of record in the file of this patent:

UNITED STATES PATENTS

| Number | Name | Date |
| --- | --- | --- |
| 896,631 | Dixon | Aug. 18, 1908 |
| 1,956,203 | Rowe | Apr. 24, 1934 |
| 2,175,053 | Ferngren | Oct. 3, 1939 |
| 2,260,750 | Kopitke | Oct. 28, 1941 |